(12) United States Patent
Ramonowski

(10) Patent No.: US 6,392,876 B1
(45) Date of Patent: May 21, 2002

(54) PORTABLE COMPUTER WITH STORAGE COMPARTMENT

(75) Inventor: Gregory Ramonowski, Schenectady, NY (US)

(73) Assignee: R & G Koncepts, LLC, Schenectady, NY (US)

( * ) Notice: Subject to any disclaimer, the term of this patent is extended or adjusted under 35 U.S.C. 154(b) by 0 days.

(21) Appl. No.: 09/840,473

(22) Filed: Apr. 23, 2001

(51) Int. Cl.[7] .................................................. G06F 1/16
(52) U.S. Cl. ...................... 361/683; 361/724; 312/216; 248/551
(58) Field of Search .............................. 361/683–686, 361/724–727, 740, 759; 292/42, 148, 151, 307 R; 70/57–58, 85; 312/216, 218; 248/551–553

(56) References Cited

U.S. PATENT DOCUMENTS

| | | | |
|---|---|---|---|
| 5,400,903 A | 3/1995 | Cooley | 206/320 |
| 6,149,001 A | 11/2000 | Akins | 206/320 |
| 6,191,942 B1 * | 2/2001 | Lee et al. | 361/683 |
| 6,208,506 B1 * | 3/2001 | Pao | 361/683 |
| 6,272,104 B1 * | 8/2001 | Liao et al. | 369/270 |

* cited by examiner

*Primary Examiner*—Leo P. Picard
*Assistant Examiner*—Hung Van Duong
(74) *Attorney, Agent, or Firm*—Spencer K. Warnick; Hoffman, Warnick & D'Alessandro LLC

(57) ABSTRACT

A portable computer having a body and a play compartment to hold a first data storage device during playing of the first data storage device. The portable computer also includes a storage compartment, separate from the play compartment, for storing a second data storage device during non-use of the second data storage device. The storage compartment may be provided in a housing within the body and/or as a housing pivotally attached to a surface of the display housing.

20 Claims, 4 Drawing Sheets

PORTABLE COMPUTER WITH STORAGE COMPARTMENT

BACKGROUND OF THE INVENTION

1. Technical Field

The present invention relates generally to portable computers and, more particularly, to a storage compartment attached to, or contained within, the body of a portable computer.

2. Related Art

Portable computers are favored mechanisms for conducting computer tasks while away from a desktop personal computer. The typical portable computer reads information from data storage devices such as compact disks, floppy disks, mini disks, DataPlay discs, and other forms of data storage devices. Portable computers are typically compact and portable/hand-held.

The body of a portable computer is usually made from a mold that is tooled and/or shaped to correspond to the size that is necessary to encompass the working components of the portable computer, e.g, the electronic parts and the data disk. The materials used to make the body of the portable computer may be polyurethane, polyethylene or the like. The body is made to be light, strong and resistant to elements like moisture, sweat and dirt.

Unfortunately, currently available portable computers suffer from a number of disadvantages. For instance, the prior art devices provide inadequate means to carry data storage devices other than what can be held in a play compartment of the portable computer. This makes it difficult to use multi-disk software packages or multiple software packages.

In view of the foregoing, it is oftentimes necessary to carry a storage unit, like a case for carrying an extra compact disk(s), floppy disk(s) and other types of data storage devices. Because many people are traveling with portables, it is inconvenient for the user to carry the extra case or container.

One portable computer storage system is disclosed in U.S. Pat. No. 6,149,001 to Akins. This storage system is a cover that wraps around a portable computer. It has compartments that hold various elements within pockets that are part of the cover. The compartments, however, are external and are therefore exposed to wear. The positioning of the compartments may also allow contents to fall out without user knowledge.

In view of the foregoing, there is a need in the art for a portable computer with a storage compartment for storing data storage devices while not in use. It would also be advantageous if the storage compartment and portable computer could hold other elements, e.g., pens, engineering rules, etc.

SUMMARY OF THE INVENTION

In a first aspect of the invention is provided a portable computer comprising: a body for housing working components; a data storage device play compartment within the body to hold a first data storage device during playing of the first data storage device; and a first storage compartment, positioned within the body and separate from the play compartment, for storing a second data storage device during non-use of the second data storage device.

In a second aspect of the invention is provided a portable computer comprising: a body for housing working components; a display housing pivotally attached to the body for positioning a display; a data storage device play compartment within the body to hold a first data storage device during playing of the first data storage device; and a first storage compartment, separate from the play compartment, for storing a second data storage device during non-use of the second data storage device, the first storage compartment being pivotally attached to the display housing.

In a third aspect of the invention is provided a portable computer comprising: a body for housing working components of the portable computer; a display housing pivotally attached to the body for positioning a display; a data storage device play compartment within the body to hold a first data storage device during playing of the first data storage device; a first storage compartment, positioned within the body and separate from the play compartment, for storing a second data storage device during non-use of the second data storage device; and a second storage compartment, separate from the play compartment, for storing a third data storage device during non-use of the third data storage device, the second storage compartment being pivotally attached to the display housing.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DETAILED DESCRIPTION OF THE INVENTION

Referring now specifically to the drawings, there is illustrated a portable computer 10 including a body for housing working components; a data storage device play compartment within the body to hold a first data storage device during playing of the first data storage device; and a first storage compartment, positioned within the body and separate from the play compartment, for storing a second data storage device during non-use of the second data storage device.

As illustrated, portable computer 10 is preferably a laptop computer. However, as will be recognized by those skilled in the art, the teachings of the invention are not to be limited to just laptop computers. For example, the present invention may be applied to personal digital assistants and other portable digital devices. Portable computer 10 includes a body 12 for housing working components thereof. Working components may include, for example, a central processing unit, a video card, battery, a hard drive, input/output devices, and any other component commonly found in portable computers.

Figure 1:
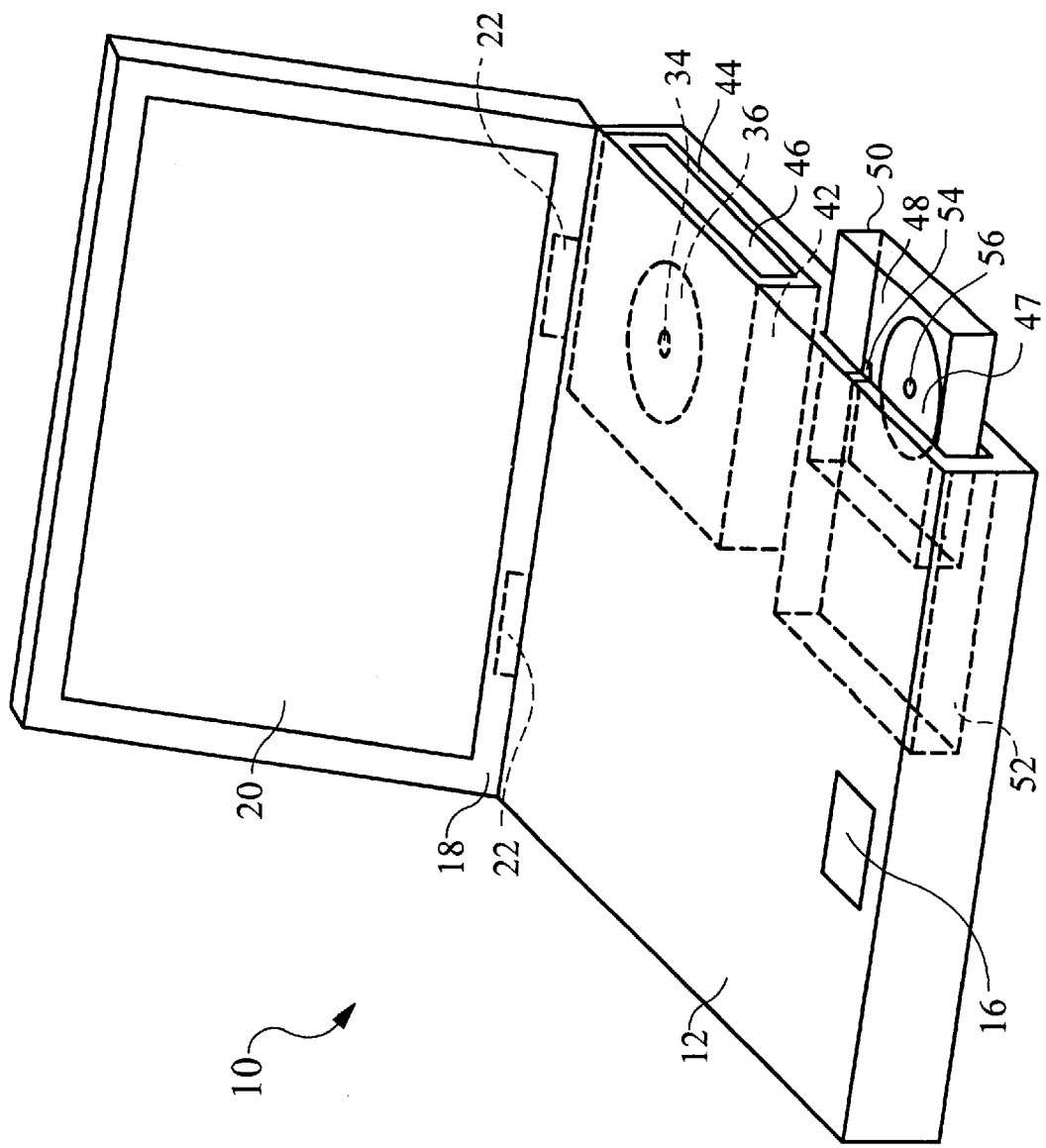
FIG. 1 is a perspective view of a portable computer with a storage compartment in accordance with a first embodiment of the invention.

A keyboard 14 (FIGS. 2 and 3 only), formed in a side of body 12, is typically provided for sending operating instructions to the working components contained within body 12. Although a variety of cursor control mechanisms are possible, a touch pad control mechanism 16 (FIGS. 1–3 only) may also typically be provided in a side of body 12. A display housing in the form of a door 18 is provided to support a display 20 and to protect keyboard 14 and cursor control mechanism 16 during non-use. Display 20 provides information pertaining to functions being performed by the electronics of portable computer 10. Display housing 18 is attached to body 12 by a hinged fastener 22. It should be recognized, however, that other door mechanisms as known in the art may also be provided within the scope of the invention, e.g., a retractable door system.

Figure 2:
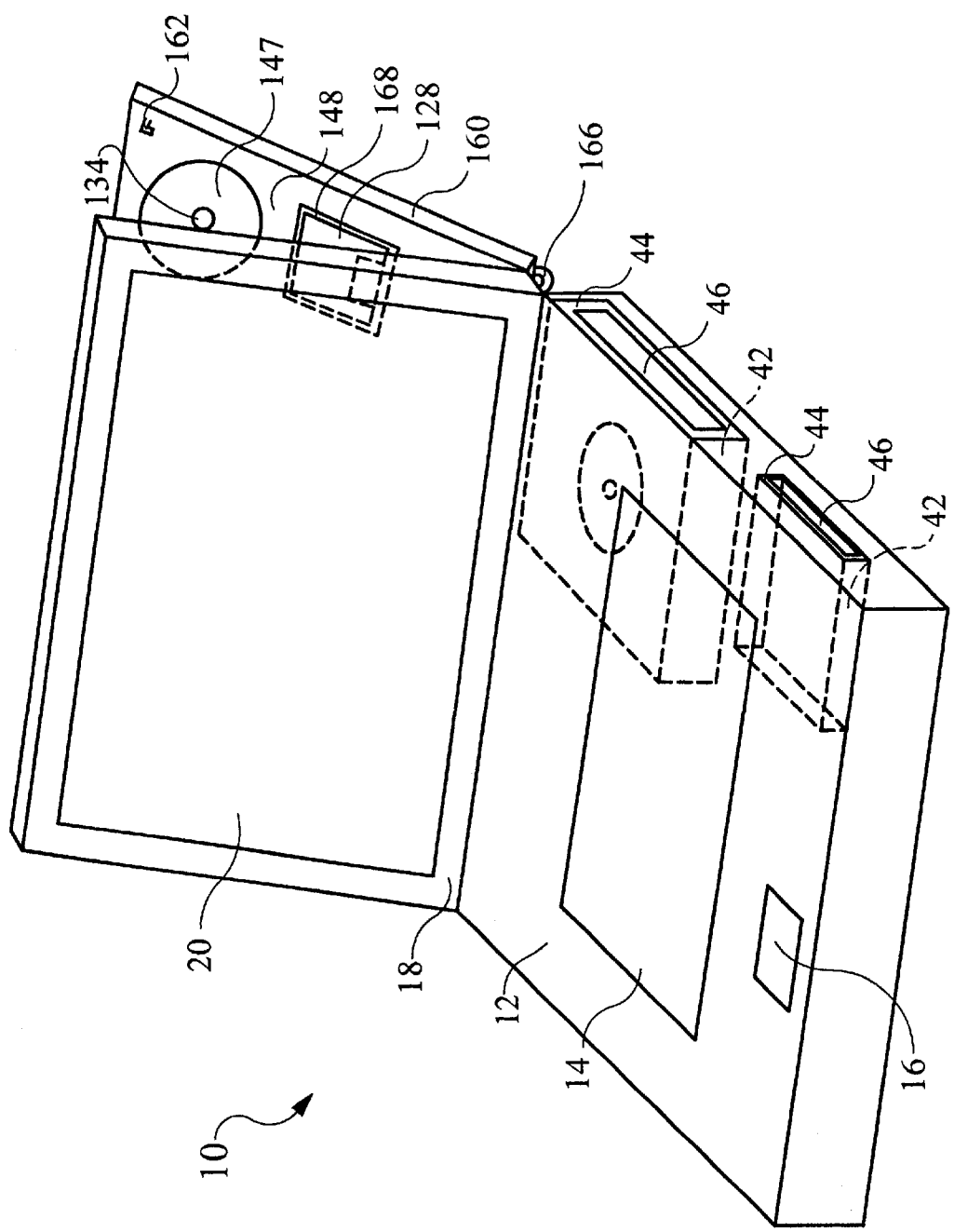
FIG. 2 is a perspective view of a portable computer with a storage compartment in accordance with a second embodiment of the invention.

A data storage device play compartment 44 is preferably provided in a recess 42 within body 12. Play compartment 44 typically includes an access door 46 for allowing a first data storage device, e.g., a compact disk or a floppy disk, to be placed within play compartment 44. As shown in FIG. 2, two play compartments 44 may be provided, e.g., one compact disk player and a floppy disk player. Where necessary, play compartment 44 (FIG. 1 only) may have a positioning member 34, in the form of a post or some other storage device positioning mechanism, to hold first data storage device 36 in place during use.

In a first embodiment in accordance with the invention, a storage compartment 48 for storing a second data storage device(s) (FIGS. 1 and 4) is provided within body 12. Second data storage device may take a variety of forms, e.g., a compact disk(s) 47 or a floppy disk(s). Compartment 48 is preferably formed as part of a housing 50, which is received in a recess 52 in body 12 that is devoid of data storage device play components such as an optical head, i.e., the recess is play component free. In a preferred setting, housing 50 is capable of moving in and out of body 12 to allow access to compartment 48. A securing tab 54 may be provided to hold housing 50 in a closed position by locking over the top, outer edge of housing 50. When the securing tab 54 is released, housing 50 and, hence, compartment 48 is movable to an open position by sliding housing 50 away from recess 52. While a securing tab has been disclosed, any latch/unlatch type mechanism may be applied to maintain a closed position or to allow access to compartment 48. Where necessary, a data storage device positioning member 56 may be placed within compartment 48. Positioning member 56 may be any member capable of holding in place one or more data storage devices 47. For example, positioning member 56 may be a post for insertion into the central opening of a compact disk 47.

Figure 3:
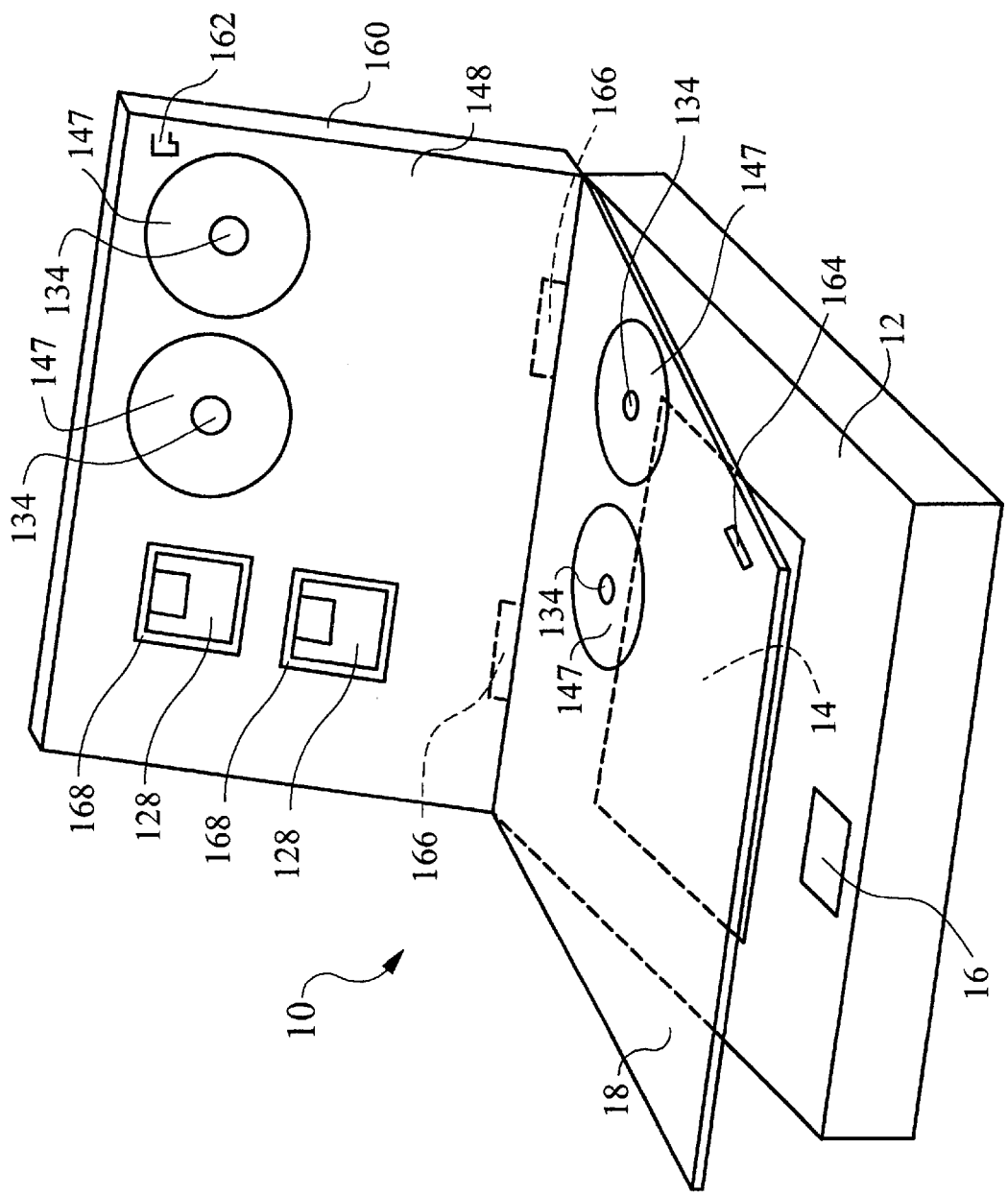
FIG. 3 is another perspective view of the portable computer of FIG. 2.

Referring to FIGS. 2 and 3, a second embodiment of the invention is illustrated. In this setting, it is preferable for a storage compartment 148 to be provided on a surface of display housing 18 opposite that of display 20. In order to form compartment 148, a housing 160 is preferably irremovably and pivotally attached to display housing 18 to form a compartment with display housing 18. A securing tab 162 may be provided to join housing 160 to display housing 18 by engaging with opening 164 (FIG. 3). When securing tab 162 is released, housing 160 and, hence, compartment 148 is movable to an open position by pivoting housing 160 about a fixed pivot 166 that is provided in body 12. Fixed pivot 166 may be combined in some fashion with display housing 18 hinge 22. It should be recognized that housings other than a hinged mechanism may also be possible, e.g., a sliding or retracting door. Other mechanisms for connection of housing 160 to display housing 18 are also possible, e.g., mating male and female connectors; hook and latch fasteners; snap connectors; magnets; etc.

Housing 160 may also include a recess 168 to position data storage devices, e.g., floppy disks 128, in place. In a preferred setting, positioning members, e.g., posts 134, may also be included. Posts 134 may be any member capable of insertion into the central opening of a unused compact disk 147. As an alternative, the surface of display housing 18 opposite display 20 may include positioning members or recesses for holding data storage devices or other objects. As illustrated, storage compartment 148 preferably covers a substantial part of the surface of display housing 18 opposite display 20.

Figure 4:
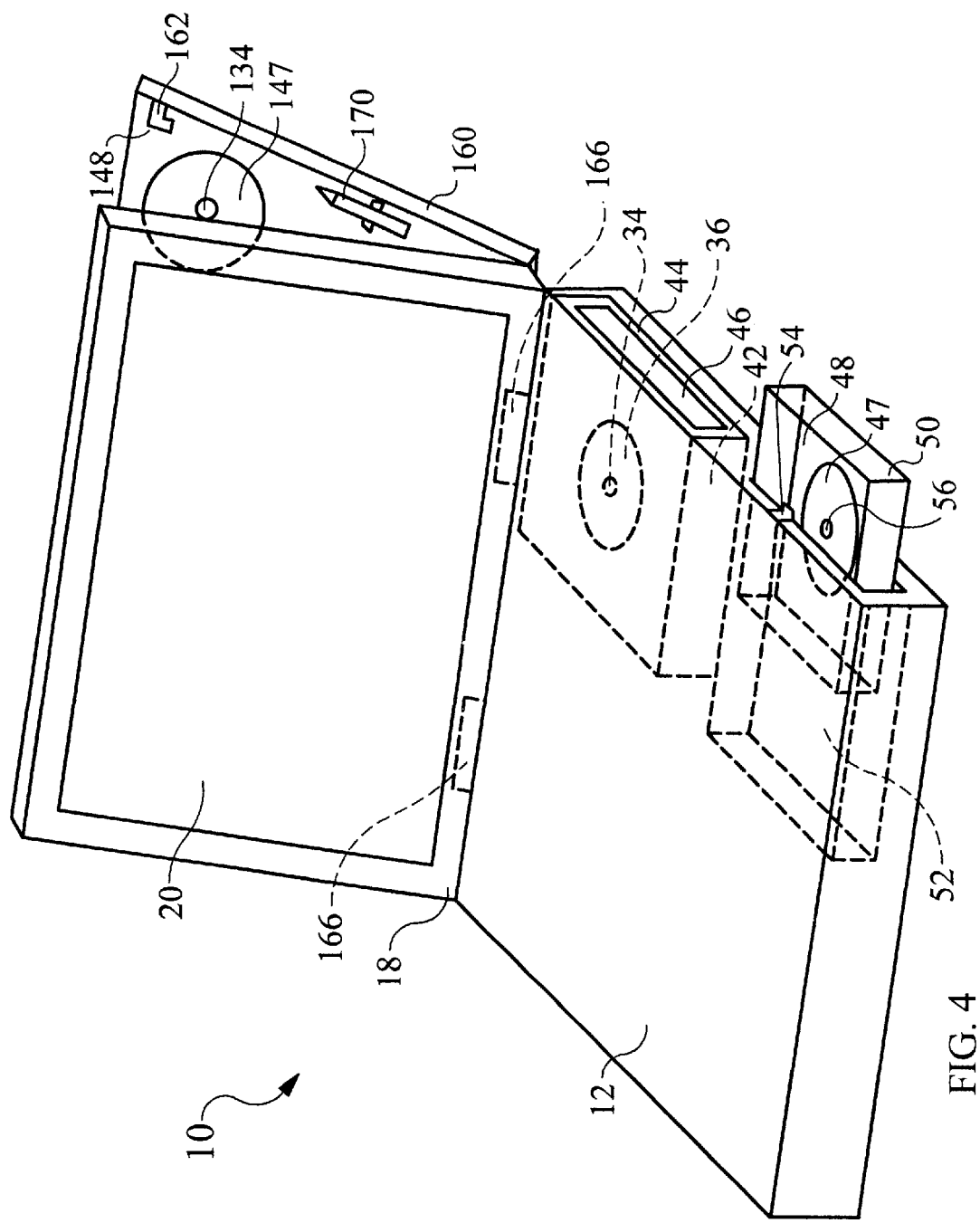
FIG. 4 is a perspective view of a portable computer with a storage compartment(s) in accordance with a third embodiment of the invention.

Referring to FIG. 4, a third embodiment of the present invention is illustrated in which the first and second embodiments are combined. That is, a portable computer 10 is provided with a compartment 48 and a compartment 148 for storing, inter alia, data storage devices 28, 47, 128, 147.

In the above embodiments, housings 50, 160 are preferably made from the same material as body 12, e.g. a form of polyurethane, polyethylene or the like. Of course, other synthetic and natural materials having similar structural characteristics may also be utilized if desired. It should be recognized that each storage compartment 48, 148 may be sized to include more than one data storage device. In addition, storage compartments 48, 148 may also be capable of holding other materials 170 (FIG. 4), e.g., pencils, pens, engineering rules etc.

The foregoing description of the preferred embodiments of the invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

What is claimed is:

1. A portable computer comprising:
   a body for housing working components,
   a data storage device play compartment within the body to hold a first data storage device during playing of the first data storage device; and
   a first storage compartment, positioned within a play component free recess of the body and separate from the play compartment, for storing a second data storage device during non-use of the second data storage device.

2. The portable computer of claim 1, further comprising a display pivotally attached to the body by a display housing.

3. The portable computer of claim 1, wherein the first storage compartment includes a data storage device positioning member.

4. The portable computer of claim 1, wherein the data storage device is a compact disk.

5. The portable computer of claim 1, wherein the data storage device is a floppy disk.

6. The portable computer of claim 2, further comprising a second storage compartment for storing a third data storage device during non-use of the third data storage device, the second storage compartment being pivotally attached to the display housing.

7. The portable computer of claim 6, wherein the second storage compartment includes a data storage device positioning member.

8. The portable computer of claim 6, wherein the second storage compartment and the display housing are made of the same material.

9. A portable computer comprising:

a body for housing working components;

a display housing pivotally attached to the body for positioning a display;

a data storage device play compartment within the body to hold a first data storage device during playing of the first data storage device; and a first storage compartment, separate from the play compartment, for storing a second data storage device during non-use of the second data storage device, the first storage compartment being pivotally attached directly to the display housing.

10. The portable computer of claim 9, further comprising a second storage compartment for storing a third data storage device during non-use of the third data storage device, the second storage compartment formed in a housing that is received in the body.

11. The portable computer of claim 9, wherein the first storage compartment includes a data storage device positioning member.

12. The portable computer of claim 9, wherein the data storage device is a compact disk.

13. The portable computer of claim 9, wherein the data storage device is a floppy disk.

14. The portable computer of claim 9, wherein the first storage compartment and the display housing are made of the same material.

15. The portable computer of claim 10, wherein the second storage compartment includes a data storage device positioning member.

16. A portable computer comprising:

a body for housing working components of the portable computer;

a display housing pivotally attached to the body for positioning, a display;

a data storage device play compartment within the body to hold a first data storage device during playing of the first data storage device;

a first storage compartment, positioned within the body and separate from the play compartment, for storing a second data storage device during non-use of the second data storage device; and a second storage compartment, separate from the play compartment, for storing a third data storage device during non-use of the third data storage device, the second storage compartment being pivotally attached directly to the display housing.

17. The portable computer of claim 16, wherein the second storage compartment includes a data storage device positioning member.

18. The portable computer of claim 16, wherein the first storage compartment includes a data storage device positioning member.

19. The portable computer of claim 16, wherein the data storage device is one of a compact disk and a floppy disk.

20. The portable computer of claim 16, wherein the second storage compartment and the display housing are made of the same material.

* * * * *